S. S. White,
Making Teeth.
Nº 34,223.      Patented Jan. 21, 1862.

Witnesses
James Laird
Richardson Gurley

Inventor
Samuel S. White

UNITED STATES PATENT OFFICE.

SAMUEL S. WHITE, OF PHILADELPHIA, PENNSYLVANIA.

MANUFACTURE OF ARTIFICIAL TEETH.

Specification forming part of Letters Patent No. 34,223, dated January 21, 1862; Reissued April 29, 1862.

*To all whom it may concern:*

Be it known that I, SAMUEL S. WHITE, of the city of Philadelphia, in the county of Philadelphia and State of Pennsylvania, have invented a new and useful Improvement in Artificial Teeth; and I do hereby declare that the following is a full, clear, and exact description of the same, reference being had to the accompanying drawings, forming part of this specification.

This invention relates to mineral teeth for what is known as vulcanite work. The teeth commonly employed in such work are secured in the vulcanite setting by the aid of pins of platinum parts of which are received in the teeth and parts in the vulcanite. These pins, which are secured in the teeth in the manufacture of the latter, and before they come into the hands of the dentist, have been commonly made without heads at their outer ends, and the only means employed to fasten them in the vulcanite, beyond the adhesion of the vulcanite itself, has been by the dentist's bending them before applying them to the setting, and the consequence has been that the pins have been very liable to tear out of the vulcanite. To obviate this difficulty and supply the dentist with teeth which are applicable to the vulcanite without any preparation or manipulation of the pins and which, after vulcanization, will be so firmly embedded and fastened in the vulcanite as not to be liable to disturbance by ordinary wear or any probable accident; and to this end my invention consists in the manufacture of the teeth with pins having heads at their outer ends.

Figure 1:
Figure 2:
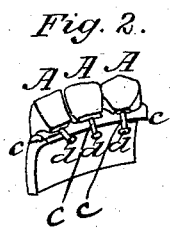
Figure 3:
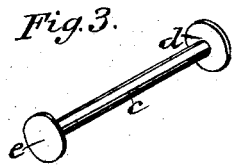
Figure 4:

To illustrate the invention, Figure 1 is a perspective view of three gum teeth A, A, A, made with platinum pins $a$, $a$, $a$, of the usual construction. Fig. 2 is a similar view of similar teeth made with platinum pins $c$, $c$, $c$, having heads $d$, $d$, $d$, at their outer ends, according to my invention. Fig. 3 is a perspective view of one of the pins $c$, $c$, $c$, before its insertion in the tooth. Fig. 4 is a transverse section of a pin illustrating a modification of the head $c$.

Similar letters of reference indicate corresponding parts where they occur in different figures.

In the manufacture of the teeth with pins having heads at their outer ends, the said heads $d$, $d$, $d$, may be of circular form projecting all around the pins as shown in Fig. 3, but in some cases it may be better to make them of the form shown in Fig. 4; that is to say, that of a circle with a segment cut off, forming a straight side the object being to avoid the protrusion of the head through the outer surface of the vulcanite; and the inner ends of the pins which are received within the teeth may also be made in the usual manner with heads as shown at $e$, in Fig. 3, or may be made of any other form that will enable them to be secured in the teeth; but with this latter part of the pin, my invention has nothing to do. As the pins having heads $d$, $d$, $d$, can not be easily molded into the teeth in the manner commonly practiced with pins like $a$, $a$, $a$, owing to its being difficult if not practically impossible to place the said heads in the molds, the ends $e$, of the said pins are placed in the teeth after the first baking or burning process technically known as "biscuiting" by drilling holes in the teeth, inserting the pins, packing around them with some of the same composition of which the teeth are made, and then subjecting the teeth to the second burning process by which they are finished. The teeth thus made with pins having heads at their outer ends are a new article of manufacture.

What I claim as my invention and desire to secure by Letters Patent, is—

The manufacture of mineral teeth with pins having heads $d$, $d$, $d$, at their outer ends, substantially as and for the purpose herein specified.

SAMUEL S. WHITE.

Witnesses:
RICHARDSON GAWLEY,
JAMES LAIRD.

[FIRST PRINTED 1911.]